United States Patent
Tian et al.

(10) Patent No.: US 12,132,807 B2
(45) Date of Patent: Oct. 29, 2024

(54) THIRD PARTY GATEWAY

(71) Applicant: Lemon Inc., Grand Cayman (KY)

(72) Inventors: Zhipeng Tian, Culver City, CA (US); Mu Du, Culver City, CA (US); Daniel Haimanot, Culver City, CA (US); Keyi Wu, Los Angeles, CA (US); Gan Fang, Los Angeles, CA (US); Zhengqin Luo, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 18/456,920

(22) Filed: Aug. 28, 2023

(65) Prior Publication Data
US 2023/0403345 A1   Dec. 14, 2023

(51) Int. Cl.
*H04L 67/63* (2022.01)
*H04L 9/40* (2022.01)

(52) U.S. Cl.
CPC ............ *H04L 67/63* (2022.05); *H04L 63/166* (2013.01)

(58) Field of Classification Search
CPC ........ H04L 67/63; H04L 51/212; H04L 67/56
See application file for complete search history.

(56) References Cited

U.S. PATENT DOCUMENTS

| | | | | |
|---|---|---|---|---|
| 11,677,723 | B2 * | 6/2023 | Wang | H04L 67/563 |
| | | | | 726/12 |
| 11,930,045 | B1 * | 3/2024 | Baker | H04L 63/0272 |
| 2019/0207916 | A1 * | 7/2019 | Couillard | H04L 9/0897 |
| 2020/0099658 | A1 * | 3/2020 | Couillard | G09C 1/00 |
| 2023/0006889 | A1 * | 1/2023 | Thyagaturu | H04L 41/5054 |
| 2023/0081612 | A1 * | 3/2023 | Wang | H04L 63/0272 |
| | | | | 726/12 |
| 2023/0403345 | A1 * | 12/2023 | Tian | H04L 67/63 |

* cited by examiner

*Primary Examiner* — David R Lazaro
(74) *Attorney, Agent, or Firm* — HSML P. C.

(57) ABSTRACT

A third party gateway for validating egress traffic in a computer network system is provided. The third party gateway includes a proxy and a gateway agent. The proxy includes a termination proxy and a forward proxy. The proxy is configured to terminate Transport Layer Security communication for the egress traffic. The proxy is further configured to forward the egress traffic to the gateway agent. The gateway agent is configured to validate the egress traffic as valid traffic or invalid traffic based on predetermined validation requirements. The proxy is further configured to receive the valid traffic or the invalid traffic from the gateway agent, and to forward the valid traffic to a destination service or to block the invalid traffic.

20 Claims, 5 Drawing Sheets

THIRD PARTY GATEWAY

FIELD

The embodiments described herein pertain generally to a third party gateway in a computer network system. More specifically, the embodiments described herein pertain to methods and systems for a third party gateway to validate egress traffic from data center and/or internal services to external network.

BACKGROUND

In a computer network system, a "gateway" or a "network gateway" may refer to a device that connects disparate networks by translating communications from one protocol to another. It is to be understood that a gateway may refer to a piece of networking hardware used in telecommunications networks that allows data to flow from one discrete network to another. It is also to be understood that a gateway may refer to a computer program configured to perform the tasks of a gateway hardware. It is further to be understood that gateways may communicate using more than one protocol to connect multiple networks and can operate at any of the seven layers of the open systems interconnection model (OSI).

SUMMARY

It is to be understood that there are different ways for transmitting egress traffic from data center and/or internal services to the external network (e.g., the Internet, etc.), including using network address translation (NAT) service, binding public Internet Protocol (IP) address to physical machine(s), etc. Features in the embodiments disclosed herein may provide a customized third party gateway that serves as a centralized place to gather all traffic (e.g., egress traffic, etc.) and/or provide assurance gateway inspecting the content and/or format of the traffic.

Features in the embodiments disclosed herein may provide data security and privacy protection over the data in the data center and/or internal services, and demonstrate and ensure the data center and/or internal services' privacy policy enforcement.

It is to be understood that when considering the data center and/or internal services as a building that belongs to a first party, the first party may open some doors of the building for information (from a second party) to enter and/or to exit the building (to the second party), and that the first party may work with a third party partners to e.g., "hire security guards" to protect the building so that no one can bring in and/or take out sensitive information. The way to achieve this is to cut-off all the access to the data center and/or internal services except for some channels with security and/or privacy gateways, and such gateways may be deployed in a neutral environment owned by the first party and the third party partners together to prove the enforcement of data security and privacy policies and to meet the standard of specific regional regulations.

Features in the embodiments disclosed herein may provide a third party gateway as a security gateway that takes all the traffic (e.g., egress traffic, etc.) from the data center and/or internal services to the external networks and applies assurance checks for all the traffic.

In one example embodiment, a third party gateway for validating egress traffic in a computer network system is provided. The third party gateway includes a proxy and a gateway agent. The proxy is configured to terminate Transport Layer Security communication for the egress traffic. The proxy is further configured to forward the egress traffic to the gateway agent. The gateway agent is configured to validate the egress traffic as valid traffic or invalid traffic based on predetermined validation requirements. The proxy is further configured to receive the valid traffic or the invalid traffic from the gateway agent, and to forward the valid traffic to a destination service or to block the invalid traffic.

In another example embodiment, an egress traffic validation system for a computer network system is provided. The egress traffic validation system includes a third party gateway. The third party gateway includes a proxy and a gateway agent. The proxy is configured to receive an egress traffic and to terminate Transport Layer Security (TLS) communication for the egress traffic. The proxy is further configured to forward the egress traffic to the gateway agent. The gateway agent is configured to validate the egress traffic as valid traffic or invalid traffic based on predetermined validation requirements. The proxy is further configured to receive the valid traffic or the invalid traffic from the gateway agent, and to forward the valid traffic to a destination service or to block the invalid traffic.

In yet another example embodiment, a method for validating egress traffic in a computer network system is provided. The method includes terminating, by a proxy, Transport Layer Security (TLS) communication for the egress traffic; forwarding, by the proxy, the egress traffic to a gateway agent; validating, by the gateway agent, the egress traffic as valid traffic or invalid traffic based on predetermined validation requirements; receiving, by the proxy, the valid traffic or invalid traffic from the gateway agent; and forwarding, by the proxy, the valid traffic to a destination service or blocking the invalid traffic.

In yet another example embodiment, a non-transitory computer-readable medium having computer-executable instructions stored thereon is provided. The instructions, upon execution, cause one or more processors to perform operations including terminating Transport Layer Security (TLS) communication for an egress traffic; validating the egress traffic as valid traffic or invalid traffic based on predetermined validation requirements; and forwarding the valid traffic to a destination service or blocking the invalid traffic.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

DETAILED DESCRIPTION

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, a "network" or a "computer network" is a term of art and may refer to interconnected computing devices that may exchange data and share resources with each other. It is to be understood that the networked devices may use a system of rules (e.g., communications protocols, etc.), to transmit information over wired or wireless technologies.

As referenced herein, a "packet", "data packet", "network packet", or "network data packet" in a computer network system is a term of art and may refer to a formatted unit of data carried by a computer network system. It is to be understood that a packet may include control information and user data. User data may refer to the "payload". Control information may provide information for delivering the payload (e.g., source and destination network addresses, error detection codes, sequencing information, etc.). It is also to be understood that control information typically may be stored in packet headers and/or trailers. It is further to be understood that control information may include metadata. Metadata in computer networking may refer to descriptive information about the user data, or "data about the data." Metadata may carry individual traits pertaining to the structure of communications protocols and the packets.

As referenced herein, a "header" of a packet may refer to an initial portion of the packet. It is to be understood that a header may contain control information such as addressing, routing, protocol version, etc. The format of the header information may depend on the communications protocol being used. For example, in the Open Systems Interconnection (OSI) model (the model used in the embodiments disclosed herein) from the International Organization for Standardization (ISO), the communications in a computer networking system may be split into different layers: a physical layer (L1), a data link layer (L2), a network layer (L3), a transport layer (L4), a session layer (L5), a presentation layer (L6), and an application layer (L7). In another example, the Transmission Control Protocol/Internet Protocol (TCP/IP) model may include a physical layer (L1), a data link layer (L2), an Internet layer (L3), a transport layer (L4), and an application layer (L5). Each layer may have its own communications protocol. For example, an L2 header may contain fields such as destination media access control (MAC) address, source MAC address, etc.

As referenced herein, a "gateway" or a "network gateway" in a computer network system is a term of art and may refer to a device that connects disparate networks by translating communications from one communication protocol to another. It is to be understood that a gateway may refer to a piece of networking hardware used in telecommunications networks that allows data to flow from one discrete network to another. It is also to be understood that a gateway may also refer to a computer program configured to perform the tasks of a gateway hardware. It is further to be understood that gateways may communicate using more than one protocol to connect multiple networks and can operate at any of the seven layers of the open systems interconnection model (OSI). In an example embodiment, a gateway may refer to a network device used in telecommunications that connects two networks with different transmission protocols together. That is, a gateway may provide a connection between two networks, and the networks do not need to use the same network communication protocol. It is to be understood that gateways may serve as an entry and exit point for a network as all data must pass through or communicate with the gateway prior to being routed.

As referenced herein, a gateway "agent" in a computer network system is a term of art and may refer to e.g., a computer program, algorithm, or the like, that may be installed on the gateway, allowing the gateway agent to manage and monitor all network traffic, among other functionalities.

As referenced herein, a "third party gateway" may refer to a gateway owned, managed, controlled, by a third party that is independent to and/or separated from the (first and second) parties that conduct the traffic communication.

As referenced herein, "traffic", "traffic flow", or "network flow" in a computer network system may refer to data (e.g., a sequence of packets, etc.) from a source computer or device to a destination computer or device, which may be another host, a multicast group, or a broadcast domain. It is to be understood that a traffic may include all packets in a specific transport connection and/or a media stream, and may include a set of packets passing an observation point in the network during a certain time interval.

As referenced herein, "egress traffic" may refer to a traffic from the data center and/or internal services (of a first party) to (a second party in) the external network (e.g., the Internet, etc.). It is to be understood that egress traffic includes requests that flow from the data center and/or internal services to the external network, and/or responses (e.g., acknowledgement, answers to the requests, etc.) corresponding to the requests that flow from the external network back to the data center and/or internal services. That is, the egress traffic includes the network request (e.g., made to get or retrieve information from a server) from the data center and/or internal services, and the network response (e.g., from the server in the external network) that corresponds to the network request (e.g., as an answer to the network request). For example, the data center and/or internal services (the first party) may rely on tools or Application Programming Interfaces (APIs) of the second party (e.g., a map tool providing place/location coordinates of a user, etc.) in the external network (e.g., the Internet, etc.) to provide or support the services provided by the first party (e.g., to end users). The first party may send the request to the tools or APIs of the second party in the external network, and the second party may send the response corresponding to the request back to the first party. The request (from the data center and/or internal services of the first party to the second party in the external network) and/or its corresponding response form the egress traffic.

As referenced herein, a "proxy" or a "proxy server" in a computer network system is a term of art and may refer to an application or a computer device that acts as an intermediary between a client requesting a resource or a service and a server providing that resource or service.

As referenced herein, a "load balancing" in a computer network system is a term of art and may refer to a process of distributing a set of tasks over a set of resources (e.g., computing units, etc.), with the aim of making their overall processing more efficient. Load balancing may optimize the response time and avoid unevenly overloading some compute nodes while other compute nodes are left idle. A "load balancer" may refer to a computer device or program configured to perform the process of load balancing.

As referenced herein, a "forward" proxy in a computer network system is a term of art and may refer to an intermediary that is disposed between internal services or devices (e.g., user devices, data center, internal services, etc.) and the external network (e.g., the Internet, etc.). It is to be understood that instead of validating a client request and sending it directly to a server, a forward proxy may evaluate the request, take any necessary actions, and route the request to the destination on the client's behalf. That is, forward proxies may help devices on a private network access the external network (e.g., the Internet, etc.). In an example embodiment, a forward proxy may be an Internet-facing proxy (instead of an internal-facing proxy) to retrieve data from a wide range of sources (e.g., from the Internet, etc.).

As referenced herein, a web application firewall or "WAF" in a computer network system is a term of art and may refer to a type of firewall that protects web applications and APIs by filtering, monitoring, and/or blocking malicious web traffic and application-layer attacks.

Figure 1:
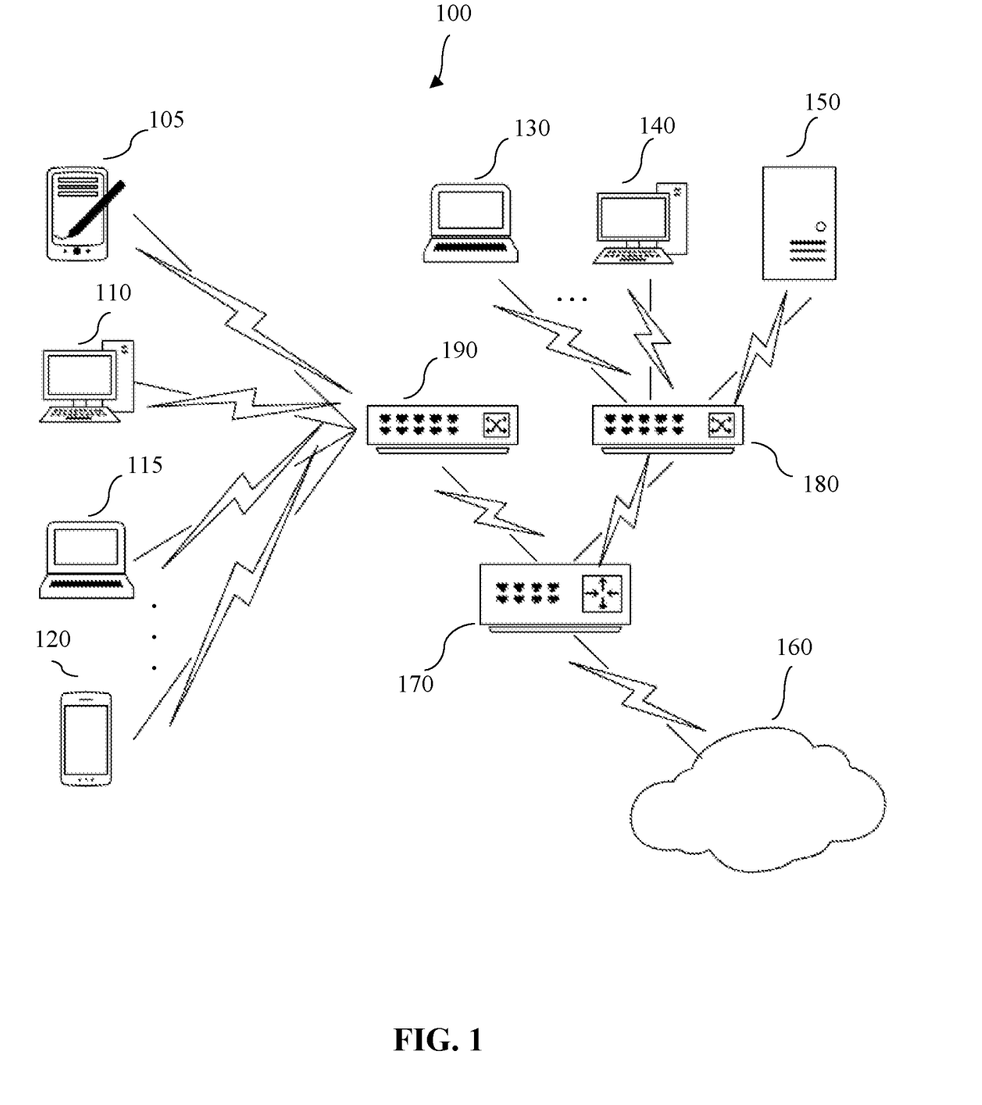
FIG. 1 is a schematic view of an example computer network system for egress traffic validation, arranged in accordance with at least some embodiments described herein.

FIG. 1 is a schematic view of an example computer network system 100 for egress traffic validation, arranged in accordance with at least some embodiments described herein.

The system 100 may include devices 105, 110, 115, 120, 130, 140, 150, a network 160, a gateway or router 170, and/or network switches 180 and 190. It is to be understood that FIG. 1 only shows illustrative numbers of the devices (105, 110, 115, 120, 130, 140, 150, 170, 180, and/or 190) and/or the network. The embodiments described herein are not limited to the number of the devices and/or the network described. That is, the number of devices and/or networks described herein are provided for descriptive purposes only and are not intended to be limiting.

In accordance with at least some example embodiments, the devices 105, 110, 115, 120, 130, 140, and/or 150 may be various electronic devices. The various electronic devices may include but not be limited to a mobile device such as a smartphone, a tablet computer, an e-book reader, a laptop computer, a desktop computer, a server, and/or any other suitable electronic devices.

In accordance with at least some example embodiments, the network 160 may be a medium used to provide a communications link among the devices 105, 110, 115, 120, 130, 140, 150, 170, 180, and/or 190. The network 160 may be the Internet, a local area network (LAN), a wide area network (WAN), a local interconnect network (LIN), a cloud, etc. The network 160 may be implemented by various types of connections, such as a wired communications link, a wireless communications link, an optical fiber cable, etc.

In accordance with at least some example embodiments, one or more of the devices 105, 110, 115, 120, 130, 140, and/or 150 may be a server for providing various services to users using one or more of other devices. The server may be implemented by a distributed server cluster including multiple servers or may be implemented by a single server.

A user may use one or more of the devices 105, 110, 115, 120, 130, 140, 150, 170, 180, and/or 190 to interact with each other via the network 160. Various applications or localized interfaces thereof, such as social media applications, online shopping services, machine learning services, or the like, may be installed on the devices 105, 110, 115, 120, 130, 140, and/or 150.

It is to be understood that software applications or services according to the embodiments described herein and/or according to the services provided by the service providers may be performed by the devices 105, 110, 115, 120, 130, 140, 150, 170, 180, and/or 190. Accordingly, the apparatus for the software applications and/or services may be arranged in the devices 105, 110, 115, 120, 130, 140, 150, 170, 180, and/or 190.

It is also to be understood that when a service is not performed remotely, the system 100 may not include the network 160, but include only the device 105, 110, 115, 120, 130, 140, 150, 170, 180, and/or 190.

It is further to be understood that the devices 105, 110, 115, 120, 130, 140, 150, 170, 180, and/or 190 may each include one or more processors, a memory, and a storage device storing one or more programs. The devices 105, 110, 115, 120, 130, 140, 150, 170, 180, and/or 190 may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

Figure 2:
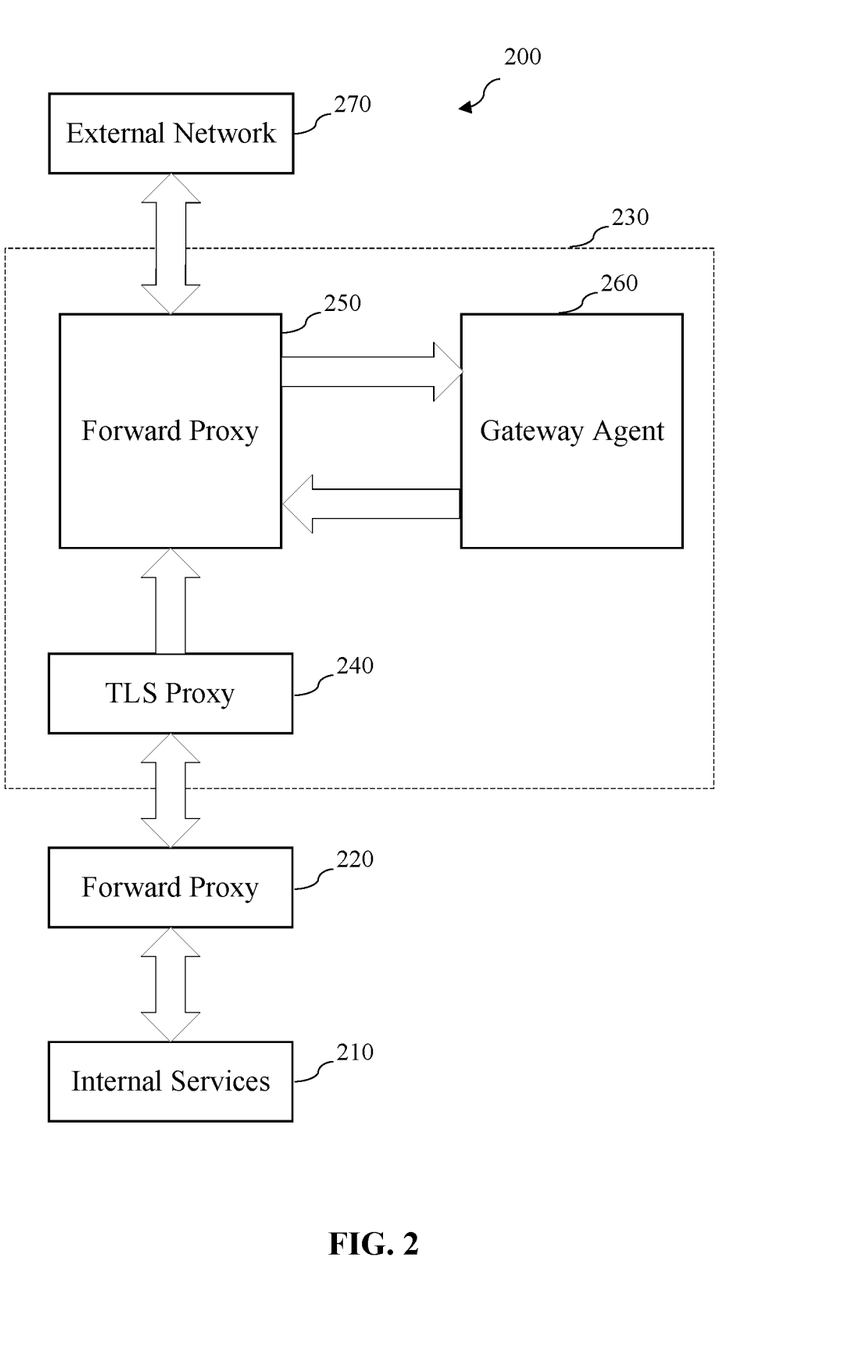
FIG. 2 is a schematic view of an example egress traffic validation system, arranged in accordance with at least some embodiments described herein.

FIG. 2 is a schematic view of an example egress traffic validation system 200, arranged in accordance with at least some embodiments described herein.

In an example embodiment, the system 200 may include data center and/or internal services 210, a proxy 220, a third party gateway 230, and external network 270. In an example embodiment, the third party gateway 230 may be the gateway 170 of FIG. 1.

The internal services 210 are configured to e.g., provide services to end users. In an example embodiment, some services provided by the internal services 210 (e.g., owned by a first party) may reply on tools or APIs of a second party (e.g., a map tool providing place/location coordinates of a user, etc.) in the external network (e.g., the Internet, etc.) to provide or support the services provided by the first party (e.g., to end users). The internal services 210 of the first party may send the request (of the egress traffic) to the tools or APIs of the second party in the external network. The request from the internal services 210 may be sent (to the second party) through the proxy 220.

In an example embodiment, the proxy 220 may be a forward proxy (e.g., owned by the first party or a third party) configured to forward the traffic (e.g., the egress traffic) received from the internal services 210 to (e.g., the TLS proxy 240 of) the third party gateway 230.

In an example embodiment, the third party gateway 230 includes a proxy (240, 250) and a gateway agent 260. In an example embodiment, the proxy (240, 250) may include a proxy (e.g., a TLS proxy, etc.) 240 and a proxy (e.g., a forward proxy, etc.) 250. In another example embodiment, the proxy (240, 250) may be a single proxy. It is to be understood that the TLS proxy 240, the forward proxy 250, and the gateway agent 260 may be combined and deployed in a neutral or trusted environment. It is also to be understood that the neutral or trusted environment may be e.g., an open source environment, a third party cloud provider, etc. so that the first party (that communicates the egress traffic with the second party) may collaborate with the third party to e.g., assure the data privacy policy enforcement of the first party.

In an example embodiment, the TLS proxy 240 is a TLS termination proxy (or a Secure Sockets Layer (SSL) termination proxy). The TLS proxy 240 may serve as a proxy that acts as an intermediary point between client and server applications, and may be used to terminate TLS tunnels (of the egress traffic) by decrypting or decoding the communications (i.e., decrypting the egress traffic). That is, the TLS proxy 240 is configured to terminate the TLS process of the egress traffic received from the proxy 220, and send the decrypted or decoded egress traffic to the forward proxy 250.

In an example embodiment, the forward proxy 250 is configured to receive the decrypted or decoded egress traffic from the TLS proxy 240, and redirect the data (e.g., the payload in the request of the egress traffic, etc.) to the gateway agent 260.

In an example embodiment, the gateway agent 260 is configured to receive the data from the forward proxy 250, and parse (e.g., every data field in) the data based on the format of the data, such as JavaScript Object Notation (JSON) format, Extensible Markup Language (XML) format, etc. The gateway agent 260 is configured to interpret the format of the data and/or the type of the data (e.g., Hypertext Transfer Protocol (HTTP) type, non-HTTP type such as HTTP/2 (or HTTP2) type, secure file transfer protocol (SFTP) type, simple mail transfer protocol (SMTP) type, Internet message access protocol (IMAP) type, and/or other application layer (L7) type).

It is to be understood that predetermined rules or validation requirements (to be described in detail in FIG. 3) may be stored in the memory of the gateway agent 260 or registered with the gateway agent 260 (e.g., via a registration platform). In an example embodiment, the predetermined rules or validation requirements may include all the schema (e.g., format, value, fields, etc.) of the requests and/or their corresponding responses that have been predetermined or predefined as satisfying the data privacy policy of the first party.

In an example embodiment, the gateway agent 260 is configured to validate the parsed data based on the predetermined rules or validation requirements. For example, if a request (and/or its response) in the egress traffic matches one of the predetermined rules or validation requirements (that is, the request and/or its response is registered with the gateway agent 260), the gateway agent 260 may validate or mark the egress traffic as valid traffic. If a request (and/or its response) in the egress traffic does not match any one of the predetermined rules or validation requirements (that is, the request and/or its response is not registered with the gateway agent 260), the gateway agent 260 may validate or mark the egress traffic as invalid traffic.

In an example embodiment, for invalid traffic, the gateway agent 260 may label the data (e.g., the request and/or its response in the egress traffic) e.g., based on the data type and make recommendations (on data type, data label, etc.) so that the first party may confirm the recommendation and/or modify the predetermined rules or validation requirements. The first party may store such request/response in or register such request/response with the gateway agent 260, and future egress traffic (having such request/response) may then be validated as valid traffic.

In an example embodiment, the forward proxy 250 may be configured to receive the valid traffic or the invalid traffic from the gateway agent 260, to forward the valid traffic to a destination service (e.g., in the external network 270) or to block the invalid traffic from being sent to the external network 270. It is to be understood that the forward proxy 250 is further configured to establish or reestablish or restore the (terminated) TLS and/or SSL communication and/or process for the valid traffic (e.g., to encrypt or encode the data in the valid traffic for secure communication) before forwarding the valid traffic to the destination service.

In an example embodiment, the destination service in the external network 270 is configured to receive the valid traffic (e.g., the request from the internal services 210), and to send a response corresponding to the request back to the internal services 210 of the first party. It is to be understood that the request (from the data center and/or internal services 210 of the first party to the second party in the external network 270) and/or its corresponding response forms or defines the egress traffic. In an example embodiment, the response may be validated by the gateway agent 260 based on the predetermined rules or validation requirements before being sent to the internal services 210 via the third party gateway 230. In another example embodiment, the response may skip the validation process before being sent to the internal services 210 via the third party gateway 230.

It is to be understood that the predetermined rules or validation requirements may be determined based on compliance or assurance requirements for the egress traffic. The third party gateway 230 is configured to provide a centralized place to (1) gather or intercept all the egress traffic from the datacenter or internal services 210 to the external network 270 (including the responses from the external network 270 to the internal services 210), (2) parse the data or payload and interpret the data or payload within the request and/or the response in the egress data, and (3) apply the privacy protection or assurance policies (e.g., based on the predetermined rules or validation requirements) to or on top of the egress traffic to validate the data or payload carried within the request and/response in the egress data.

It is to be understood that features described in the embodiments disclosed herein provide a third party gateway 230 that serves as an egress gateway and is responsible for inspecting egress traffic from the assured Internet data center environment (i.e., the neutral or trusted environment). In an example embodiment, the third party gateway 230 incudes the gateway agent 260, the forward proxy 250, and the TLS proxy 240 that are deployed in three separate containers within a pod on a system (e.g., an open-source system for automating deployment, scaling, and management of containerized applications, etc.). Egress traffic (e.g., the request from the internal services 210, etc.) may be forwarded to the third party gateway 230 (e.g., by the proxy 220) with the TLS connection terminated at the proxy 240, before the request is passed through to the proxy 250. The proxy 250 passes the request on through a connection (e.g., an Internet Content Adaptation Protocol (ICAP) Transmission Control Protocol (TCP) socket connection) to the gateway agent 260 for traffic assurance before the request is forwarded onto the destination services in the external network 270 or is blocked. In an example embodiment, the gateway agent 260 may be a WAF agent.

Figure 3:
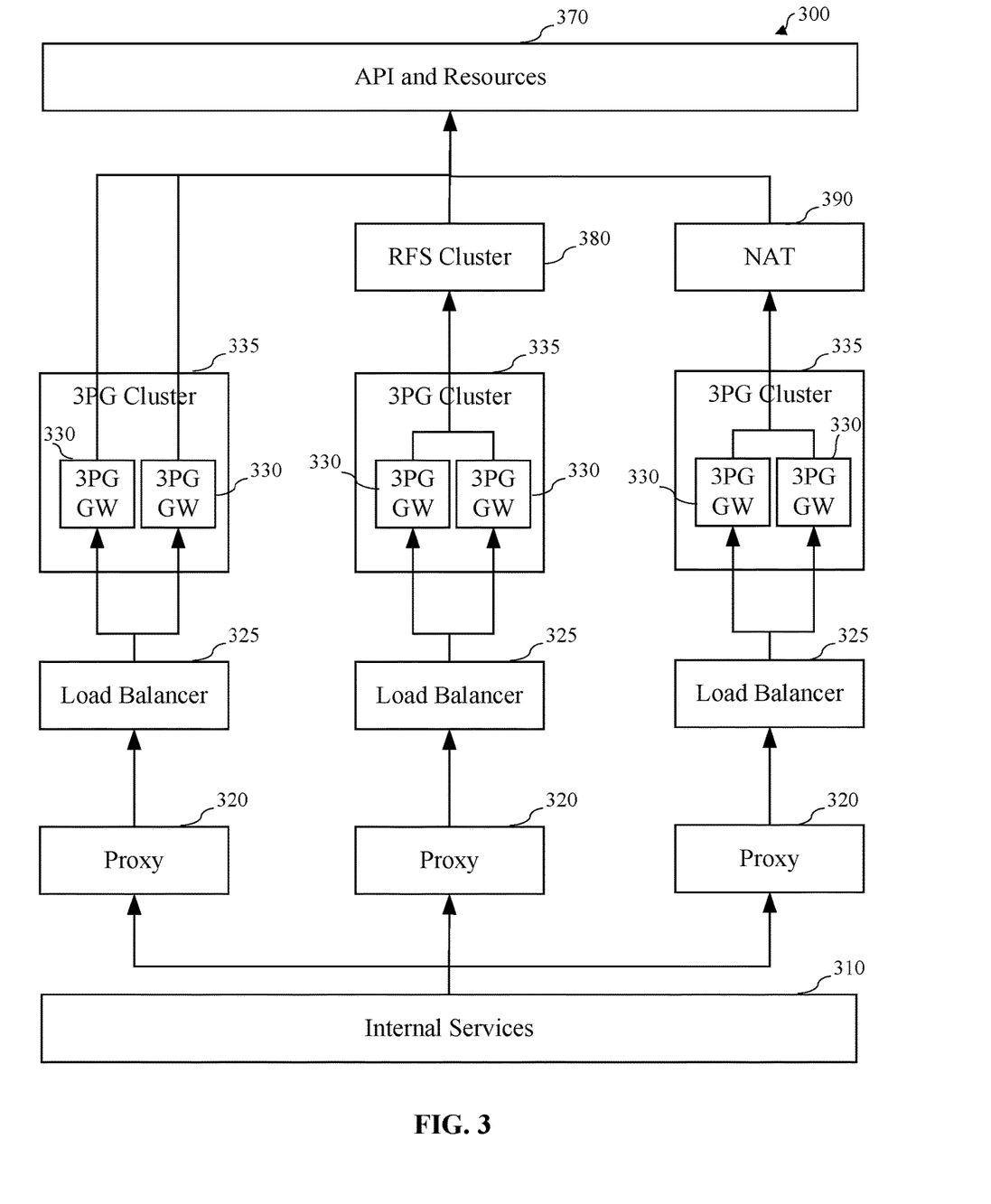
FIG. 3 is a schematic view of another example egress traffic validation system, arranged in accordance with at least some embodiments described herein.

FIG. 3 is a schematic view of another example egress traffic validation system 300, arranged in accordance with at least some embodiments described herein. It is to be understood that unless specified otherwise, the system 300 may have a same process, configuration, arrangement, and/or structure as the system 200 of FIG. 2.

In an example embodiment, the system 300 includes internal services 310, at least one proxy 320, at least one third party gateway 330, and the "API and Resources" 370. It is to be understood that unless specified otherwise, the internal services 310 may have a same process, configuration, arrangement, and/or structure as the internal services 210 of FIG. 2; the proxy 320 may have a same process, configuration, arrangement, and/or structure as the proxy 220 of FIG. 2; the third party gateway 330 may have a same process, configuration, arrangement, and/or structure as the third party gateway 230 of FIG. 2; and the API and Resources 370 may have a same process, configuration, arrangement, and/or structure as the external network 270 of FIG. 2.

In an example embodiment, the system 300 also includes at least one load balancer 325, at least one third party gateway cluster 335, a RFS device or a RFS cluster 380, and/or a NAT device 390. Each third party gateway cluster 335 includes one, two, or more third party gateways 330. Each RFS cluster 380 includes one or more RFS devices.

It is also to be understood that the system 300 supports both HTTP and non-HTTP based protocols. Typically, an HTTP request may include (1) a verb indicating HTTP methods such as GET, PUT, POST, etc., (2) a uniform resource identifier (URI) identifying the resource on the server, (3) the HTTP version indicating version of the HTTP protocol, (4) the request header containing metadata such as client type, cache settings, message body format, etc. for HTTP request message, and (5) the request body representing content of the message. An HTTP response may include (1) a status/response code indicating the status of the server for requested resource, (2) the HTTP version indicating version of the HTTP protocol, (3) the response header including metadata such as content length, content type, server length, etc. for HTTP response message, and (4) the response body representing response message content.

It is further to be understood that non-HTTP based protocols may require non-trivial handling of data and may therefore be implemented in a Request Forwarding Service (RFS) device or RFS cluster 380 separated from the third party gateway 330. The RFS device or RFS cluster 380 may be configured to operate as a middle layer between the source (e.g., the internal services 310) and destination services (e.g., the API and Resources 370 in the external network) of the egress traffic, and may expose an HTTP API to translate HTTP requests (from the source) to protocol specific messages to and from the destination service. For example, the RFS device supports protocols such as secure file transfer protocol (SFTP), simple mail transfer protocol (SMTP), etc. over HTTP. It is also to be understood that for non-HTTP egress traffic to use the third party gateway 330, service owners may be required to refactor their service to use RFS specific APIs for their protocols. If no protocol plugin exists (e.g., in the RFS device) for their service, owners may be asked to develop protocol plugin for their specific service so that the RFS device or RFS cluster 380 may translate the request from the source to protocol specific messages to and from the destination service in the external network (370, 270).

It is further to be understood that the "NAT" in a computer network system is a term of art and may refer to network address translation. A NAT service or device may be configured to map multiple private addresses inside a local network to a public IP address before transferring the information onto the Internet. For example, organizations that want multiple devices to employ a single IP address may use NAT. Some payment APIs in the external network (370, 270) may require a fixed NAT IP address. The NAT device 390 may be configured to support such requirement.

In an example embodiment, the internal services 310 are configured to send the request (in the form of egress traffic) to the API and Resources 370 in the external network via the proxy 320. Based on the type of the request (e.g., HTTP request where the destination service does not require fixed NAT IP address, non-HTTP request, HTTP request where the destination service requires fixed NAT IP address, etc.), the internal services 310 are configured to send the request (in the form of egress traffic) to the third party gateway cluster 335 (e.g., the left, middle, or right cluster 335 in FIG. 3, respectively) corresponding to the type of the request, via the corresponding proxy 320.

It is to be understood that unlike in some embodiments of egress gateways where all service traffic is forwarded from a single proxy to the traditional egress gateway to enable authorization and authentication of the source for all egress traffic, features in the embodiments described herein may split the egress traffic across proxy instances 320 (e.g., the left, middle, and right proxy 320 in FIG. 3, respectively) based on the type of the request, and each request forwarded to the third party gateway 330 may have a proxy account header injected into the request (e.g., by the proxy 320), which is then used by the gateway agent (e.g., 260 of FIG. 2) as part of the key in addition to the request (e.g., the domain and API path, etc.) to lookup the corresponding request schema (e.g., in the predetermined rules or validation requirements).

It is also to be understood that splitting the egress traffic across the proxy instances 320 based on the type of the request may be due to the different destination service requirements, such as, e.g., a fixed NAT IP (via NAT service 390) for payment APIs (in the external network 370), outgoing non-HTTP traffic to go through the RFS service 380, etc.

In an example embodiment, the load balancer 325 is configured to send the request from the proxy 320 to a corresponding third party gateway 330 in the third party gateway cluster 335. The third party gateway 330 is configured to identify the egress traffic by the proxy account header which is injected at the proxy 320 for all outbound/egress traffic. The third party gateway 330 may use the proxy account in addition to the request data (e.g., the request domain and API path, etc.) to match corresponding request schema (e.g., in the predetermined rules or validation requirements) from the data/rule registry service, to validate the API request schemas that are pre-defined (e.g., based on the predetermined rules or validation requirements).

In an example embodiment, the third party gateway 330 (or 230) may be configured to perform an endpoint validation on the egress traffic. It is to be understood that the endpoint validation may be used to identify the destination service (in the external network) to which the request (in the egress traffic) is sending to. The endpoint validation includes validating the domain and API path information (and/or the proxy account inserted by the proxy 320) in the request based on the predetermined rules or validation requirements.

For example, for a request (from internal services of the first party) to a map tool or API (of a second party in the external network) providing place or location coordinates of a user, etc., the request (e.g., containing "map.secondparty.com/getLocationCoordinates") may include the domain (represented by domain name such as "secondparty.com" and/or hostname such as "map", and the API path "/getLocationCoordinates" for the API that returns the coordinates of the location). Such domain and API path information (and/or the proxy account inserted by the proxy 320) of the request have to match one of the predetermined rules or validation requirements stored in or registered with the third party gateway 330 to be determined as valid traffic, e.g., registered API endpoint and domain. If there is no match between the request and the predetermined rules or validation requirements, the traffic may be determined as invalid traffic. It is to be understood that every request in the egress traffic may have to pass endpoint validation to be determined as valid traffic.

In an example embodiment, the third party gateway 330 (or 230) may be configured to perform an account validation on the egress traffic to validate that the request is sending data to an account/storage of the second party in the external network. It is to be understood that the first party may have account, storage, tool, APIs, server, system, and/or data center in the external network as well. It is also to be understood that to ensure that no protected data may be sent to a first party owner account or storage in the external network, the third party gateway 330 (or 230) may be configured to label and validate the field that may have an indication of the account/ownership/identification information in the following sections: (1) HTTP Request Header, (2) HTTP Query Parameter (e.g., a defined set of parameters attached to the end of a URL, which are extensions of the URL that are used to help define specific content or actions based on the data being passed), (3) HTTP Request Body, (4) fully qualified domain name (FQDN), and/or (5) HTTP Uniform Resource Identifier (URI) Path. It is also to be understood that in addition to annotating and labeling the field containing account information, the value of the field may also be provided, and that the third party gateway 330 (or 230) may be configured to validate that the requests (in the egress traffic) are only going to these pre-declared accounts (based on the predetermined rules or validation requirements) to be determined as valid traffic.

In an example embodiment, the third party gateway 330 (or 230) may be configured to perform a schema validation on the egress traffic to validate all the fields in the data/payload of the requests (in the egress traffic), based on the predetermined rules or validation requirements. The fields include: (1) HTTP request headers (note that common HTTP headers such as content-length are not included), (2) HTTP request Query Parameters, and/or (3) structural data in the HTTP request body, etc. Only when all the fields in the data/payload of the requests have the corresponding matches in the predetermined rules or validation requirements, the schema validation of the traffic may pass and such traffic may be determined as valid traffic.

It is to be understood that the predetermined validation requirements which may include endpoint validation, account validation, and/or schema validation may be performed based on, e.g., different types of the requests and different levels of validation requirements the second party requires. For example, egress traffic going to a highly trusted (which is predefined in the predetermined rules or validation requirements) second party may only require endpoint validation; whereas any egress traffic going to a typical/normal second party may require endpoint, account, and/or schema validations.

In an example embodiment, for any egress traffic going to the first party controlled servers/data centers or systems (in the external network), for example, the video archive services sending GET requests to download video from the first party controlled data center in the external network, the validation requirement may require validating API endpoint (i.e., endpoint validation) for the request and the full HTTP schema.

In an example embodiment, for requests going to normal second parties in the external network and carrying information that indicates the ownership of the user account associated with the second party destination API, for example, the stripe payment API account owned by a payment processing party, the validation requirement may require validating the endpoint and domain for the request, as well as matching the account identifying information in the request with account values annotated and approved in the registered request schema (e.g., the predetermined rules or validation requirements). That is, both endpoint and schema validations may be required.

In an example embodiment, for egress traffic going to highly trusted (predefined) second parties in the external network, for example, a highly trusted second party user tax account statements upload, the validation requirement may require validating API endpoint and domain for the request only (i.e., endpoint validation only).

In an example embodiment, for egress traffic goes to some second party APIs (in the external network) that do not carry protected data and the second party does not store any data, for example, embedded map widget in the first party's service which uses the second party's map API, the validation requirement may require validating API endpoint and domain (i.e., endpoint validation) and providing an official statement that the API does not store any data and providing an API document as evidence.

In an example embodiment, for request (in the egress traffic) sent for upstream service calling, going via a second party to individuals or end users, for example, mobile user push notification service, or the first party's general email service, the validation requirement may require validating API endpoint and domain (i.e., endpoint validation) and a full schema validation, and checking template values.

In an example embodiment, for requests sent to user/external passed in uniform resource locators (URLs), for example, an HTTP-based callback function that allows lightweight, event-driven communication between two application programming interfaces (APIs), the validation requirement may require Stage 1: validating by proxy account and HTTP method; and Stage 2: (1) when the backend services are sending out such requests to users passed in URL, backend services may add a specific header in the HTTP request to mark that such requests are sent to a user passed in URL; (2) HTTP method verification: the request method needs be consistent, e.g., consistently using the GET method; (3) such requests may have an empty body, which may be used as a potential condition for validation; and (4) if (3) does not apply and there is actually data being sent out to those URLs, such request may have a fixed schema, and in such case, schema validation may be required.

It is to be understood that for non-HTTP egress traffic, the third party gateway 330 (or 230) may be configured to sample all non-HTTP protocol services after the request has been forwarded to the Request Forwarding Service (RFS). Further, each request may have an account information field, domain, and API path registered in order for the third party gateway to verify the destination. That is, both endpoint and account validations may be required.

Figure 4:
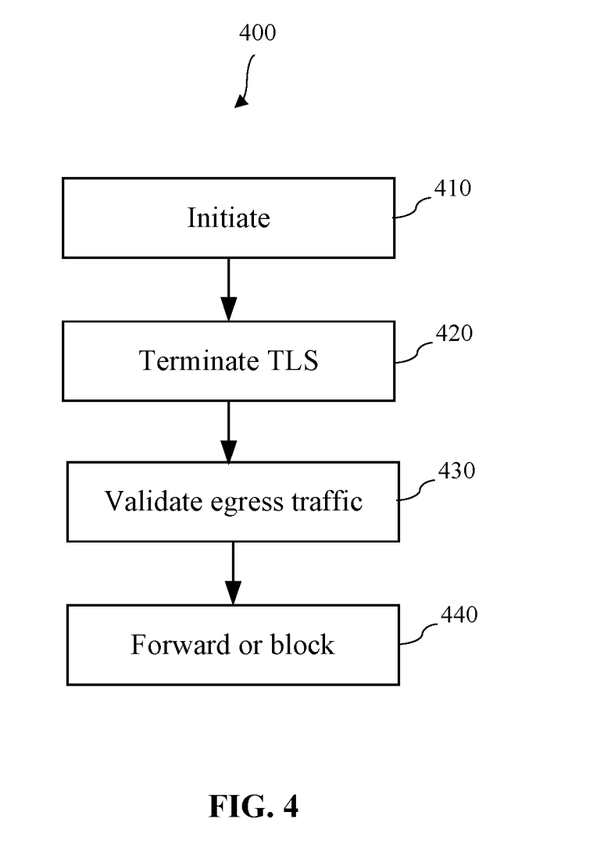
FIG. 4 is a flow chart illustrating an example processing flow of validating egress traffic in a computer network system, in accordance with at least some embodiments described herein.

FIG. 4 is a flow chart illustrating an example processing flow 400 of validating egress traffic in a computer network system, in accordance with at least some embodiments described herein.

Figure 5:
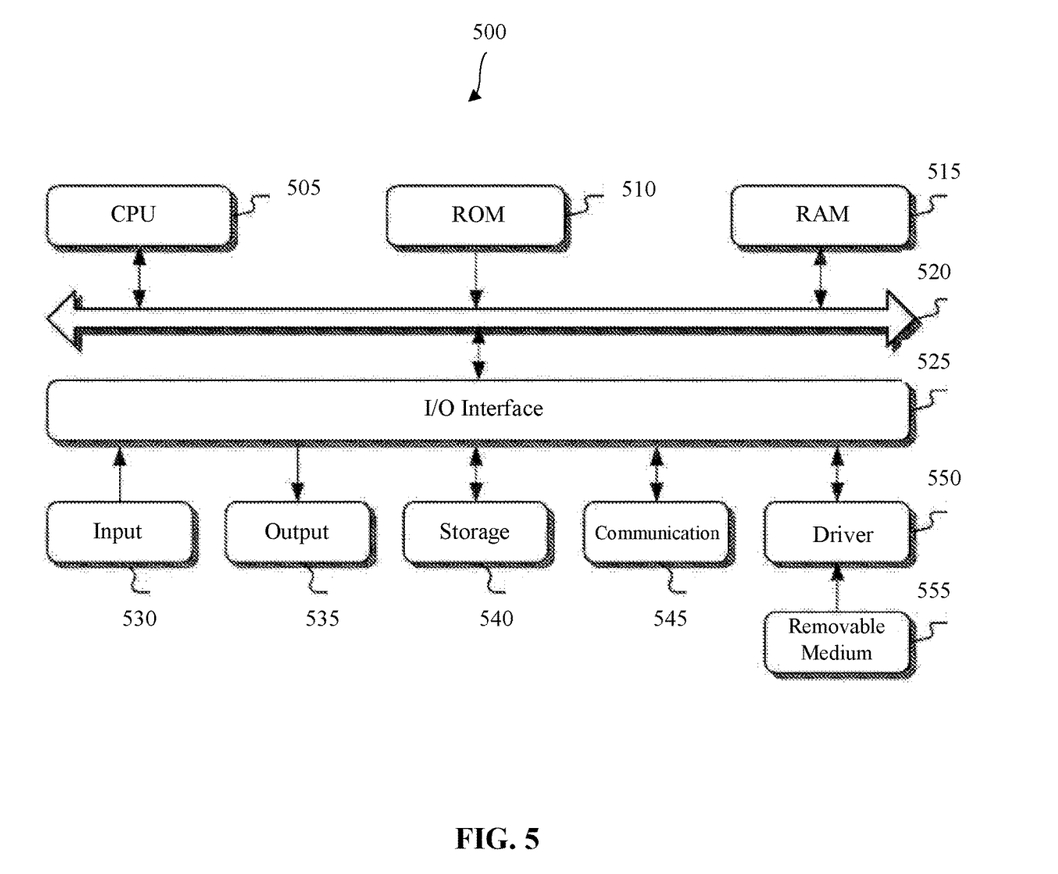
FIG. 5 is a schematic structural diagram of an example computer system applicable to implementing a device, arranged in accordance with at least some embodiments described herein.

It is to be understood that the processing flow 400 disclosed herein can be conducted by one or more processors such as a local device management CPU of the device (e.g., the gateway, etc.), including e.g., the processor of one or more of the device 105, 110, 115, 120, 130, 140, 150, 170, 180, and/or 190 of FIG. 1, the CPU 505 of FIG. 5, and/or any other suitable processor, unless otherwise specified.

It is also to be understood that the processing flow 400 can include one or more operations, actions, or functions as illustrated by one or more of blocks 410, 420, 430, and 440. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 400, operations including initializations or the like may be performed. For example, system parameters and/or application parameters may be initialized. It is to be understood that the processes, operations, or actions described in FIGS. 2 and 3 may be implemented or performed by the processor. Processing flow 400 may begin at block 410.

At block 410 (Initiate), the processor may perform initializations for the third party gateway (230, 330). In an example embodiment, the processor may provide a memory space for the third party gateway (230, 330) to store the predetermined rules for traffic validation. A user (e.g., administrator, owner, authorized user, etc.) (e.g., of the first party) may store predetermined rules in or register the predetermined rules with the third party gateway (230, 330) e.g., via a registration platform. The predetermined rules may include e.g., all the schema (e.g., format, value, fields, etc.) of the requests and/or their corresponding responses that have been predetermined or predefined as satisfying the data privacy policy of the first party, the corresponding proxy account header information, etc. (see description of FIGS. 2 and 3). Processing may proceed from block 410 to block 420.

At block 420 (Terminate TLS), the processor may (1) receive or obtain egress traffic (e.g., from the proxy 220 or 320, or from the load balancer 325), and (2) terminate the TLS communication or process (of the egress traffic) e.g., by decrypting or decoding the communications (i.e., decrypting the egress traffic), and/or send the decrypted or decoded egress traffic to (e.g., the forward proxy 250). Processing may proceed from block 420 to block 430.

At block 430 (Validate egress traffic), the processor may (1) receive or obtain the decrypted or decoded egress traffic from the proxy (240), (2) forward (the payload, the request, etc. in) the decrypted or decoded egress traffic to the gateway agent (260), and (3) validate the egress traffic based on the predetermined rules in block 410. When the egress traffic matches one or more of the predetermined rules (e.g., the request and/or response of the egress traffic exists in or is registered with the third party gateway (230, 330)), the processor may determine and/or mark the egress traffic as valid traffic. When the egress traffic does not match any of the predetermined rules (e.g., the request and/or response of the egress traffic does not exist in or is not registered with the third party gateway (230, 330)), the processor may determine and/or mark the egress traffic as invalid traffic. It is to be understood that the processor may also (1) parse, interpret, and determine the type of the request (or response), and (2) perform endpoint, account, and/or schema validation on the egress traffic based on its type. If the endpoint, account, and/or schema validation passes based on the predetermined rules (e.g., the fields of the endpoint, account, and/or schema validation match one or more of the predetermined rules), the processor may determine and/or mark the egress traffic as valid traffic. If the endpoint, account, and/or schema validation does not pass based on the predetermined rules, the processor may determine and/or mark the egress traffic as invalid traffic.

At block 440 (Forward or block), the processor may receive or obtain the valid or invalid traffic from the gateway agent 260. The processor may also (1) forward the valid traffic to the destination service (e.g., in the external network 270 or 370, via the RFS device or cluster 380, or via the NAT device 390), or (2) block the invalid traffic from being sent to the destination service. The processor may further establish or reestablish or restore the TLS communication or process (of the valid traffic) e.g., by encrypting or encoding the communications (i.e., encrypting the egress traffic) for secure communication, before forwarding the valid traffic to the destination service.

It is to be understood that processor may also perform the steps or methods described in FIGS. 2 and 3. It is also to be understood that features in the embodiments disclosed herein may provide validation (e.g., endpoint, account, and/or schema validation) on egress traffic from the data center and/or internal services of the first party to the second party tools and/or APIs in the external network. Features in the embodiments disclosed herein may also provide traffic interception and validation on different types of application layer (L7) network protocols.

FIG. 5 is a schematic structural diagram of an example computer system 500 applicable to implementing a device (for example, 105, 110, 115, 120, 130, 140, 150, 170, 180, and/or 190 of FIG. 1), arranged in accordance with at least some embodiments described herein. It is to be understood that the computer system shown in FIG. 5 is provided for illustration only instead of limiting the functions and applications of the embodiments described herein.

As depicted, the computer system 500 may include a central processing unit (CPU) 505. The CPU 505 may perform various operations and processing based on programs stored in a read-only memory (ROM) 510 or programs loaded from a storage device 540 to a random-access memory (RAM) 515. The RAM 515 may also store various data and programs required for operations of the system 500. The CPU 505, the ROM 510, and the RAM 515 may be connected to each other via a bus 520. An input/output (I/O) interface 525 may also be connected to the bus 520.

The components connected to the I/O interface 525 may further include an input device 530 including a keyboard, a mouse, a digital pen, a drawing pad, or the like; an output device 535 including a display such as a liquid crystal display (LCD), a speaker, or the like; a storage device 540 including a hard disk or the like; and a communication device 545 including a network interface card such as a LAN card, a modem, or the like. The communication device 545 may perform communication processing via a network such as the Internet, a WAN, a LAN, a LIN, a cloud, etc. In an embodiment, a driver 550 may also be connected to the I/O interface 525. A removable medium 555 such as a magnetic disk, an optical disk, a magneto-optical disk, a semiconductor memory, or the like may be mounted on the driver 550 as desired, such that a computer program read from the removable medium 555 may be installed in the storage device 540.

It is to be understood that the processes described with reference to the flowchart of FIG. 4 and/or the processes described in other figures may be implemented as computer software programs or in hardware. The computer program product may include a computer program stored in a computer readable non-volatile medium. The computer program includes program codes for performing the method shown in the flowcharts and/or GUIs. In this embodiment, the computer program may be downloaded and installed from the network via the communication device 545, and/or may be installed from the removable medium 555. The computer program, when being executed by the central processing unit (CPU) 505, can implement the above functions specified in the method in the embodiments disclosed herein.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects:

It is appreciated that any one of aspects can be combined with each other.

Aspect 1. A third party gateway for validating egress traffic in a computer network system, the third party gateway comprising: a proxy; and a gateway agent, wherein the proxy is configured to terminate Transport Layer Security (TLS) communication for the egress traffic, the proxy is further configured to forward the egress traffic to the gateway agent, the gateway agent is configured to validate the egress traffic as valid traffic or invalid traffic based on predetermined validation requirements, and the proxy is further configured to receive the valid traffic or the invalid traffic from the gateway agent, and to forward the valid traffic to a destination service or to block the invalid traffic.

Aspect 2. The third party gateway of aspect 1, wherein the proxy includes a termination proxy and a forward proxy, the termination proxy is configured to terminate the TLS communication for the egress traffic.

Aspect 3. The third party gateway of aspect 1 or aspect 2, wherein the proxy is further configured to reestablish the TLS communication for the valid traffic before forwarding the valid traffic to the destination service.

Aspect 4. The third party gateway of any one of aspects 1-3, wherein the gateway agent is configured to perform an endpoint validation for the egress traffic.

Aspect 5. The third party gateway of any one of aspects 1-4, wherein the gateway agent is configured to perform an account validation for the egress traffic.

Aspect 6. The third party gateway of any one of aspects 1-5, wherein the gateway agent is configured to perform a schema validation for the egress traffic.

Aspect 7. The third party gateway of any one of aspects 1-6, wherein the proxy is configured to forward the valid traffic to the destination service via a request forwarding service.

Aspect 8. The third party gateway of any one of aspects 1-6, wherein the proxy is configured to forward the valid traffic to the destination service via a network address translation service.

Aspect 9. An egress traffic validation system for a computer network system, the egress traffic validation system comprising: a third party gateway including a proxy and a gateway agent; wherein the proxy is configured to receive an egress traffic and to terminate Transport Layer Security (TLS) communication for the egress traffic, the proxy is further configured to forward the egress traffic to the gateway agent; the gateway agent is configured to validate the egress traffic as valid traffic or invalid traffic based on predetermined validation requirements, and the proxy is further configured to receive the valid traffic or the invalid traffic from the gateway agent, and to forward the valid traffic to a destination service or to block the invalid traffic.

Aspect 10. The egress traffic validation system of aspect 9, wherein the proxy includes a termination proxy and a forward proxy, the termination proxy is configured to receive the egress traffic and to terminate the TLS communication for the egress traffic.

Aspect 11. The egress traffic validation system of aspect 9 or aspect 10, further comprising: a request forwarding service, wherein the proxy is configured to forward the valid traffic to the destination service via the request forwarding service.

Aspect 12. The egress traffic validation system of any one of aspects 9-11, further comprising: a network address translation service, wherein the proxy is configured to forward the valid traffic to the destination service via the network address translation service.

Aspect 13. The egress traffic validation system of any one of aspects 9-12, wherein the proxy is further configured to reestablish the TLS communication for the valid traffic before forwarding the valid traffic to the destination service.

Aspect 14. The egress traffic validation system of any one of aspects 9-13, wherein the gateway agent is configured to perform an endpoint validation for the egress traffic.

Aspect 15. The egress traffic validation system of any one of aspects 9-14, wherein the gateway agent is configured to perform an account validation for the egress traffic.

Aspect 16. The egress traffic validation system of any one of aspects 9-15, wherein the gateway agent is configured to perform a schema validation for the egress traffic.

Aspect 17. The egress traffic validation system of any one of aspects 9-16, further comprising: a second proxy, wherein the second proxy is configured to receive the egress traffic from a source service and to forward the egress traffic to a load balancer.

Aspect 18. A method for validating egress traffic in a computer network system, the method comprising: terminating, by a proxy, Transport Layer Security (TLS) communication for the egress traffic; forwarding, by the proxy, the egress traffic to a gateway agent; validating, by the gateway agent, the egress traffic as valid traffic or invalid traffic based on predetermined validation requirements; receiving, by the proxy, the valid traffic or invalid traffic from the gateway agent; and forwarding, by the proxy, the valid traffic to a destination service or blocking the invalid traffic.

Aspect 19. The method of aspect 18, wherein the proxy includes a termination proxy and a forward proxy, the method further comprising terminating the TLS communication for the egress traffic by the termination proxy.

Aspect 20. The method of aspect 18 or aspect 19, further comprising: reestablishing, by the proxy, the TLS communication for the valid traffic before forwarding the valid traffic to the destination service.

Aspect 21. The method of any one of aspects 18-20, further comprising: performing, by the gateway agent, an endpoint validation for the egress traffic.

Aspect 22. The method of any one of aspects 18-21, further comprising: performing, by the gateway agent, an account validation for the egress traffic.

Aspect 23. The method of any one of aspects 18-22, further comprising: performing, by the gateway agent, a schema validation for the egress traffic.

Aspect 24. The method of any one of aspects 18-23, further comprising: forwarding, by the proxy, the valid traffic to the destination service via a request forwarding service.

Aspect 25. The method of any one of aspects 18-24, further comprising: forwarding, by the proxy, the valid traffic to the destination service via a network address translation service.

Aspect 26. A non-transitory computer-readable medium having computer-executable instructions stored thereon that, upon execution, cause one or more processors to perform operations comprising: terminating Transport Layer Security (TLS) communication for an egress traffic; validating the egress traffic as valid traffic or invalid traffic based on predetermined validation requirements; and forwarding the valid traffic to a destination service or blocking the invalid traffic.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A third party gateway for validating egress traffic in a computer network system, the third party gateway comprising:
    a proxy; and
    a gateway agent,
    wherein the proxy is configured to terminate Transport Layer Security (TLS) communication for the egress traffic before forwarding the egress traffic to the gateway agent,
    the egress traffic is split across proxy instances before being received by the third party gateway and includes at least one request having a proxy account header indicative of one of the proxy instances,
    the gateway agent is configured to validate the egress traffic as valid traffic or invalid traffic based on predetermined validation requirements and the proxy account header, and
    the proxy is further configured to receive the valid traffic or the invalid traffic from the gateway agent, and to forward the valid traffic to a destination service or to block the invalid traffic.

2. The third party gateway of claim 1, wherein the proxy includes a termination proxy and a forward proxy, the termination proxy is configured to terminate the TLS communication for the egress traffic.

3. The third party gateway of claim 1, wherein the proxy is further configured to reestablish the TLS communication for the valid traffic before forwarding the valid traffic to the destination service.

4. The third party gateway of claim 1, wherein the gateway agent is configured to perform an endpoint validation based on a type of the at least one request for the egress traffic to identify the destination service.

5. The third party gateway of claim 1, wherein the gateway agent is configured to perform an account validation based on a type of the at least one request for the egress traffic to validate the egress traffic of a first party being sent to an account of a second party.

6. The third party gateway of claim 1, wherein the gateway agent is configured to perform a schema validation based on a type of the at least one request for the egress traffic to validate all data fields in the at least one request.

7. The third party gateway of claim 6, wherein when all the data fields in the at least one request of the egress traffic have matches in the predetermined validation requirements, the egress traffic is determined as the valid traffic.

8. The third party gateway of claim 7, wherein the data fields in the at least one request include request headers, request parameters, and structural data in a request body.

9. The third party gateway of claim 1, wherein the egress traffic is split based on a type of the at least one request and sent to the proxy via the respective proxy instances, the proxy is configured to forward the valid traffic to the destination service directly, via a request forwarding service, or via a network address translation service based on the type of the at least one request.

10. The third party gateway of claim 9, wherein the request forwarding service is separated from the third party gateway and configured to translate the at least one request to protocol specific messages.

11. An egress traffic validation system for a computer network system, the egress traffic validation system comprising:
    a third party gateway including a proxy and a gateway agent;
    wherein the proxy is configured to receive an egress traffic and to terminate Transport Layer Security (TLS) communication for the egress traffic before forwarding the egress traffic to the gateway agent;
    the egress traffic is split across proxy instances before being received by the third party gateway and includes at least one request having a proxy account header indicative of one of the proxy instances,
    the gateway agent is configured to validate the egress traffic as valid traffic or invalid traffic based on predetermined validation requirements and the proxy account header, and
    the proxy is further configured to receive the valid traffic or the invalid traffic from the gateway agent, and to forward the valid traffic to a destination service or to block the invalid traffic.

12. The egress traffic validation system of claim 11, wherein the proxy includes a termination proxy and a forward proxy, the termination proxy is configured to receive the egress traffic and to terminate the TLS communication for the egress traffic.

13. The egress traffic validation system of claim 11, further comprising:
    a request forwarding service and a network address translation service,
    wherein the egress traffic is split based on a type of the at least one request and sent to the proxy via the respective proxy instances, the proxy is configured to forward the valid traffic to the destination service directly, via the request forwarding service, or via the network address translation service based on the type of the at least one request.

14. The egress traffic validation system of claim 11, wherein the proxy is further configured to reestablish the TLS communication for the valid traffic before forwarding the valid traffic to the destination service.

15. The egress traffic validation system of claim 11, wherein the gateway agent is configured to perform an endpoint validation based on a type of the at least one request for the egress traffic to identify the destination service, or perform an account validation based on the type of the at least one request for the egress traffic to validate the egress traffic of a first party being sent to an account of a second party.

16. The egress traffic validation system of claim 11, wherein the gateway agent is configured to perform a schema validation based on a type of the at least one request for the egress traffic to validate all data fields in the at least one request.

17. The egress traffic validation system of claim 11, further comprising:
   a second proxy,
      wherein the second proxy is configured to receive the egress traffic from a source service and to forward the egress traffic to the third party gateway via a load balancer.

18. A method for validating egress traffic in a computer network system, the method comprising:
   terminating, by a proxy, Transport Layer Security (TLS) communication for the egress traffic before forwarding the egress traffic to a gateway agent, wherein the egress traffic is split across proxy instances before being received by the proxy and includes at least one request having a proxy account header indicative of one of the proxy instances;
   validating, by the gateway agent, the egress traffic as valid traffic or invalid traffic based on predetermined validation requirements and the proxy account header;
   receiving, by the proxy, the valid traffic or invalid traffic from the gateway agent; and
   forwarding, by the proxy, the valid traffic to a destination service or blocking the invalid traffic.

19. The method of claim 18, wherein the proxy includes a termination proxy and a forward proxy, the method further comprising terminating the TLS communication for the egress traffic by the termination proxy.

20. The method of claim 18, further comprising:
   reestablishing, by the proxy, the TLS communication for the valid traffic before forwarding the valid traffic to the destination service.

* * * * *